Figure 1:
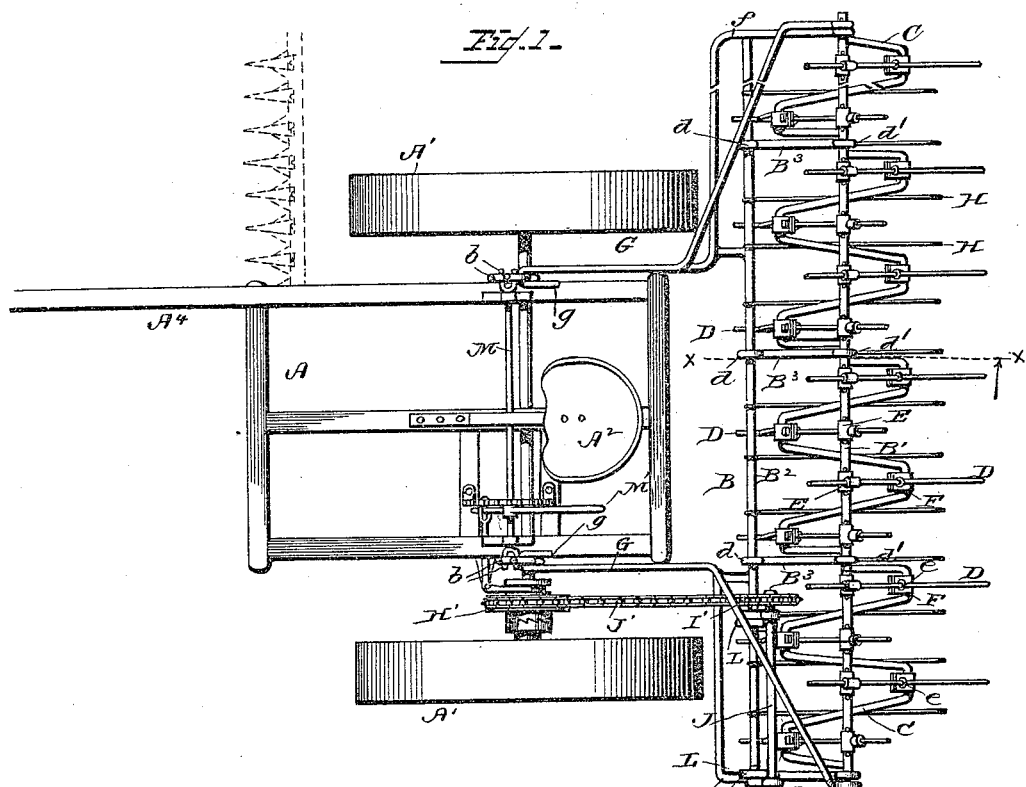

(No Model.) 2 Sheets—Sheet 1.
D. F. SAURER.
COMBINED MOWER AND HAY TEDDER.

No. 438,492. Patented Oct. 14, 1890.

Witnesses
Inventor
Daniel F. Saurer
By his Attorney
Franklin H. Hough (No Model.) 2 Sheets—Sheet 2.
D. F. SAURER.
COMBINED MOWER AND HAY TEDDER.
No. 438,492. Patented Oct. 14, 1890.
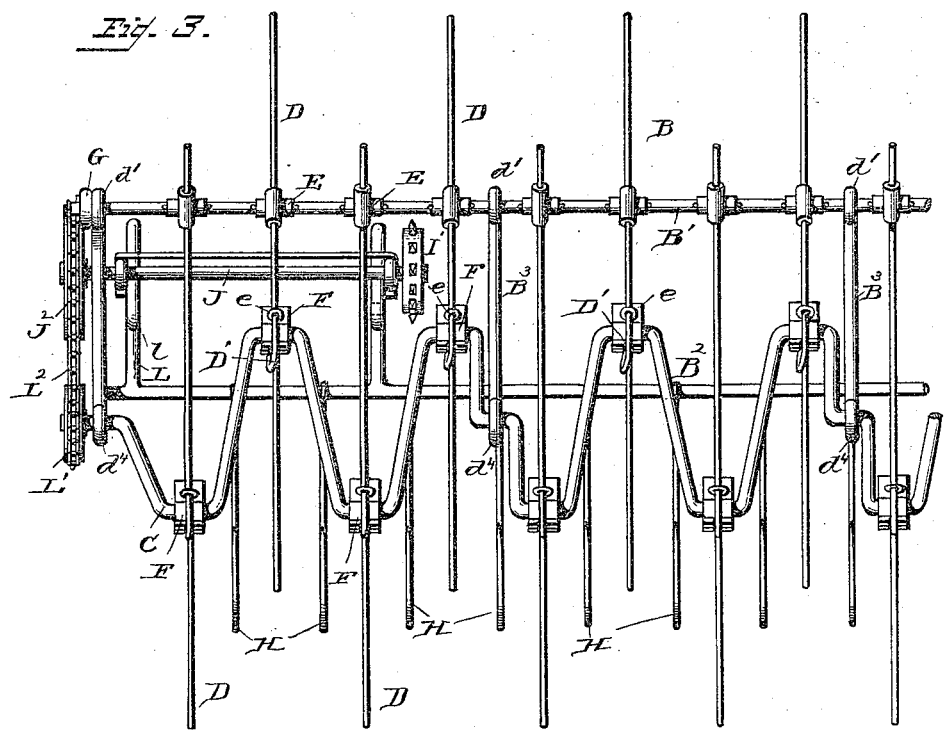
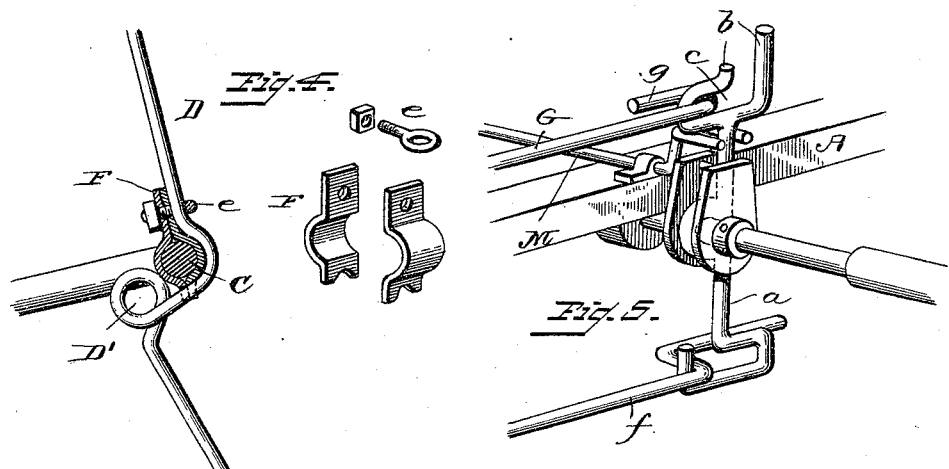

UNITED STATES PATENT OFFICE.

DANIEL F. SAURER, OF LAUD, INDIANA.

COMBINED MOWER AND HAY-TEDDER.

SPECIFICATION forming part of Letters Patent No. 438,492, dated October 14, 1890.

Application filed May 24, 1890. Serial No. 352,995. (No model.)

*To all whom it may concern:*

Be it known that I, DANIEL F. SAURER, a citizen of the United States, residing at Laud, in the county of Whitley and State of Indiana, have invented certain new and useful Improvements in a Combined Mower and Hay-Tedder; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in combined mowing-machines and hay-tedders; and it has for its object primarily to improve upon the device shown and described in the patent, No. 423,491, granted to me March 18, 1890.

In the present construction I provide a more simple and cheaper means for connecting the prongs to the crank-shaft, which also allows of the ready removal of a prong, in case it should become broken or damaged. I also provide for the raising and lowering of the tedder from the mower. I provide novel means for connecting the tedder to the mower and guard-fingers to prevent the hay from winding round the crank-shaft.

Other objects and advantages of the invention will hereinafter appear, and the novel features thereof will be specifically defined by the appended claims.

The novelty in the present instance resides in the peculiar combinations and the construction, arrangement, and adaptation of parts, whereby the ends briefly outlined are accomplished, as more fully hereinafter described, shown in the drawings, and then particularly pointed out in the claims.

The invention is clearly illustrated in the accompanying drawings, which, with the letters of reference marked thereon, form a part of this specification, and in which—

Figure 2:
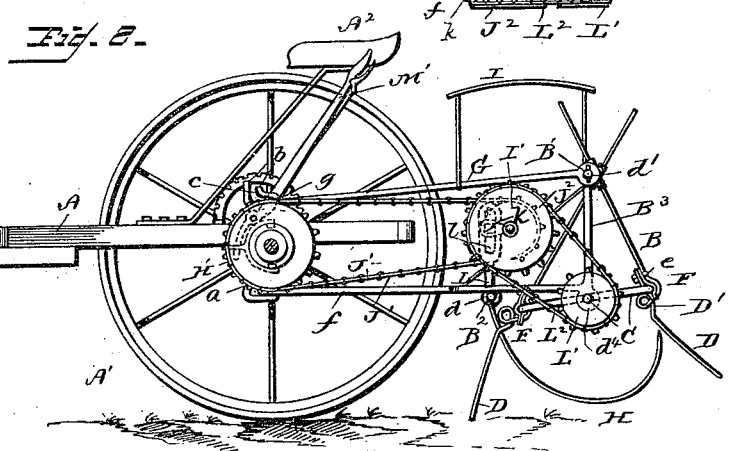
Figure 3:
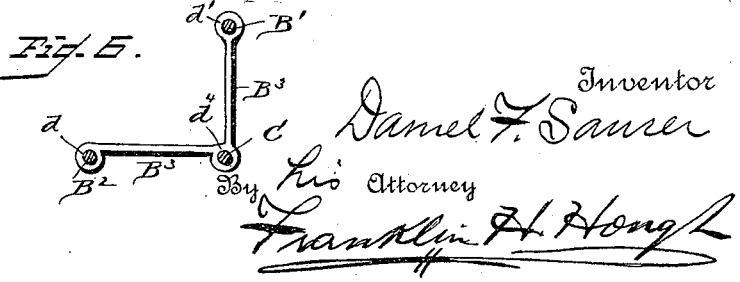

Figure 1 is a plan view of the machine with parts broken away. Fig. 2 is a side elevation with one of the wheels removed. Fig. 3 is an enlarged rear view of the crank-shaft and its connected parts. Fig. 4 is an enlarged detail showing the manner of connecting the prongs to the shaft. Fig. 5 is a detail showing the manner of connecting the tedder to the mower-frame. Fig. 6 is a detail of the short rods of the tedder-frame.

Like letters of reference indicate like parts throughout the several views.

Referring now to the details of the drawings by letter, A designates the main frame of the mower, A' the wheels, $A^2$ the seat, and $A^4$ the pole of a mowing-machine, which may be of any of the common and well-known forms of construction so far as these parts are concerned.

On the axle of the mower there are pivoted the brackets $a$, which extend substantially vertically and both above and below the axle, as shown, terminating at their upper ends in the two arms $b$, one of which is longer than the other, and with a curved recess or bearing $c$, the portion extending below the axle terminating in a substantially L-shaped form open at the rear upper side, as shown.

B is the tedder-frame, which consists of the transverse rods or bars B' and the bars $B^2$, which are held together by means of the short arms or rods $B^3$. These short arms or bars are bent to form a substantially V shape and formed at two of the angles with eyes or loops $d'$ and $d$, in the former of which the rod or bar B' is free to turn, while in the other the rod or bar $B^2$ is rigidly held, or this latter bar may be held in any suitable manner. In the loops $d^4$ at the lowest angle is journaled the crank-shaft C, which carries the prongs D, and as all the prongs are secured and operate in the same manner a description of one will suffice for all. Each prong consists of a steel rod, which near its center has a coil or convolute D', which bears upon the clip F on the crank-shaft, as shown, and has one end free, while the other end passes loosely through a guide or thimble E, which is sleeved on the bar B' and free to oscillate thereon. The prong is secured to the crank of the crank-shaft by means of a clip F, which is bifurcated to embrace the shaft and is free to oscillate thereon, the clip being provided with an eyebolt $e$, which passes through the clip, and through the eye of which the prong is passed. This forms a very simple and secure means of affixing the prong and provides for easy and ready removal for repairs when necessary. I have found that by giving the prong a little more freedom at its union with the crank-shafts better results are obtained, and the coil at this point serves to prevent injury to the prong in case an obstruction is met with.

The V-shaped end bars of the tedder-frame are extended forward, as shown at $f$, and are bent inward parallel with the bars B' B² for a distance, then forward, and their free ends are formed into hooks to engage the hooks upon the under side of the mower-frame, as shown.

On the bar B' and free to revolve thereon are the forwardly-extending arms G, which are also formed with hooks $g$ to engage the upwardly-extending arms of the bracket on the axle of the mower. By this construction the tedder can be readily separated from or connected with the mower by raising the rear end of the tedder sufficiently to disengage the hooks of the arms from the brackets on the mower-axle.

H are spring-rods attached to the rod B² and curved under the crank-shaft to prevent the hay from wrapping around the crank-shaft.

I is a shield above the upper ends of the prongs to protect the driver and prevent injury to him should he happen to fall backward from his seat.

In operation the prongs work in the same manner as in my prior patent above referred to.

H' is a sprocket-wheel on the axle of the mower, and I' is a smaller sprocket-wheel carried by a shaft J, journaled in suitable bearings, which are adjustable on the tedder-frame. An endless belt or band J' connects these two sprocket-wheels, and thus motion is imparted to the shaft J from the mower. The uprights which carry the bearings for the shaft J are pivoted at their lower ends, and near their upper ends are provided with lateral portions $k$, which work in the slots $l$ in arms L, which project upward from the tedder-frame and in which the same may be adjusted and held by set-screws or other suitable devices to tighten the belt or band when occasion may require. Upon the outer end of this shaft J is another sprocket-wheel J², around which and a smaller sprocket-wheel L' on the end of the crank-shaft passes an endless belt or band L², by which motion is imparted to the crank-shaft.

M is a shaft running transversely of the mower-frame and journaled to rock in suitable bearings thereon. This shaft is connected at its ends in any suitable manner with the brackets on the mower-axle, and is provided with a lever M', by the movement of which the tedder may be raised from the ground sufficiently to provide for its transportation without contact of the prongs with the ground. The lever is provided with a spring-actuated pawl which engages a notched segment in the usual manner in this class of devices to hold the same in its adjusted positions.

What I claim as new is—

1. The combination, with the mower-frame and the axle, of the brackets on the axle and the tedder-frame having hooked arms detachably engaging the said brackets, substantially as specified.

2. The combination, with the mower-frame and the axle, of the oscillating brackets on the axle, the tedder-frame having hooked arms detachably engaging said brackets, and means for tilting the brackets and raising the tedder-frame from the mower, substantially as specified.

3. The combination, with the mower-frame and the axle, of the oscillating brackets on the axle, the tedder-frame having arms detachably engaging said brackets, the transverse shaft journaled in bearings on the mower, and the lever on the mower, connected with said brackets, substantially as and for the purpose specified.

4. The combination, with the crank-shaft, of the clip embracing the same, the prong, and an eyebolt through the clip, and through the eye of which the prong passes, as set forth.

5. The combination, with the crank-shaft and the clip embracing the same and carrying an eyebolt, of the prong D, passed through said eyebolt and having a coil D' bearing on the clip, substantially as specified.

6. The combination, with the tedder-frame and the crank-shaft, of the clips embracing the cranks of the said shaft, the eyebolts passed through the clips, and the prongs D, passed loosely through the thimbles and rigidly held in the eyebolts and formed near their centers with a coil D', bearing on the clip on the crank-shaft, substantially as specified.

In testimony whereof I affix my signature in presence of two witnesses.

DANIEL F. SAURER.

Witnesses:
W. R. RICHARDS,
RICHARD WHITE.